United States Patent [19]

Kikuchi

[11] 4,306,764
[45] Dec. 22, 1981

[54] PUSH BUTTON-TYPE FOCUSING MECHANISM FOR BINOCULARS

[75] Inventor: Yukihiro Kikuchi, Naganoken, Japan

[73] Assignee: Light Koki Co., Ltd., Suwashi, Japan

[21] Appl. No.: 171,653

[22] Filed: Jul. 23, 1980

[30] Foreign Application Priority Data

Aug. 3, 1979 [JP] Japan ............. 54-106853[U]

[51] Int. Cl.³ .................................. G02B 7/06
[52] U.S. Cl. ........................................ 350/76
[58] Field of Search ............... 350/76, 75, 74, 77, 350/46, 47, 36, 145, 146

[56] References Cited

FOREIGN PATENT DOCUMENTS 26-8672 8/1951 Japan ........................ 350/77
5081840 11/1973 Japan .
54-105540 1/1978 Japan .

Primary Examiner—Jon W. Henry

Attorney, Agent, or Firm—Armstrong, Nikaido, Marmelstein & Kubovcik

[57] ABSTRACT

A push button-type mechanism for binoculars which includes a connecting plate having a recessed portion with a bottom and side walls formed in the center portion thereof, the plate at each end thereof being pivotally attached to body tubes having lens frames. A slide frame having inclined surfaces is attached to a lead shaft and positioned in the recessed portion such that one end of the shaft extends slidably through one side wall of the recessed portion. A set of push buttons having shoulder portions and inclined legs are slidably positioned on the inclined surfaces of the slide frame and between the inclined surfaces of the side frame and the perpendicular walls of the recessed portion. A balance spring contacts the shoulder portions of the push buttons. An arm is attached to the extended portion of the lead shaft and the lens frames wherein depression of the buttons causes the lens frames to move to a position of focus on an object being observed.

8 Claims, 3 Drawing Figures

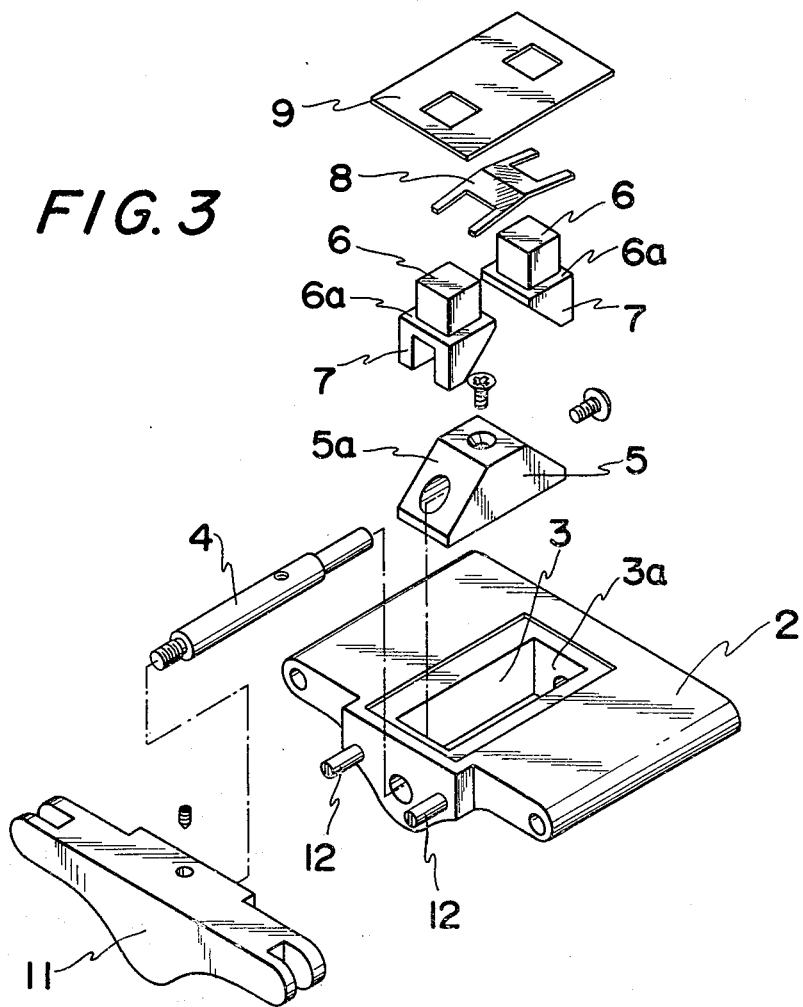

PUSH BUTTON-TYPE FOCUSING MECHANISM FOR BINOCULARS

SUMMARY OF INVENTION

The present invention relates to a push button-type focusing mechanism for binoculars wherein two push buttons are provided near the center of a connecting plate and focusing is accomplished by pushing the buttons.

BACKGROUND OF INVENTION

The focusing mechanisms for binoculars which are known heretofore are such that a male thread of a lead shaft is screwed to a female thread of a center delivery knob and a lens frame interlocking with the lead shaft is shifted by turning the center delivery knob, or a slide plate is provided on the upper surface of the connecting plate, and an inclined groove is engraved on the under surface of the slide plate, and a pin projecting from the lead shaft is fitted to the inclined groove, and the slide plate is slidably moved in right and left directions and the lens frame interlocking with the lead shaft is shifted.

BRIEF DESCRIPTION OF INVENTION

Reference will now be made to the accompanying drawings which illustrate by way of an example a construction according to the invention and in which:

FIG. 3 is an exploded view of FIG. 2 of the present invention.

DETAILED DESCRIPTION OF INVENTION

Figure 1:
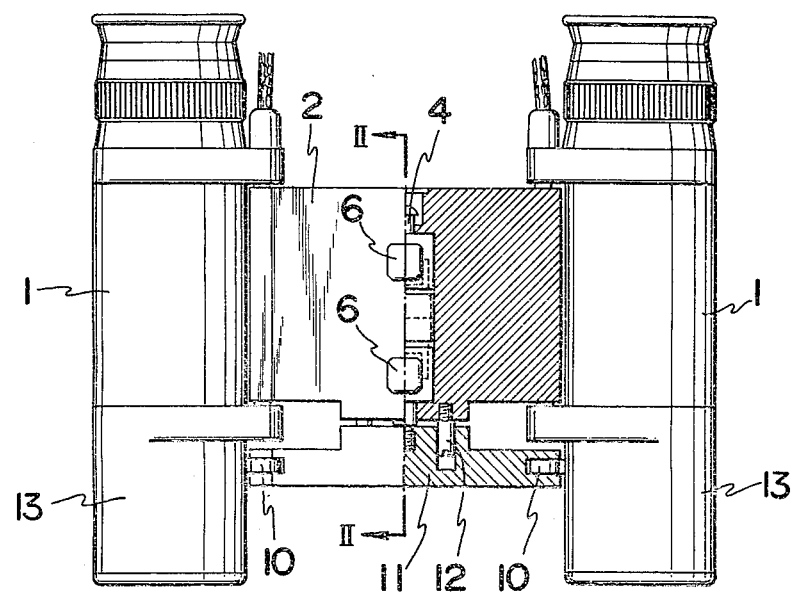
FIG. 1 is an elevation showing a cross section of a part of the present invention.
Figure 2:
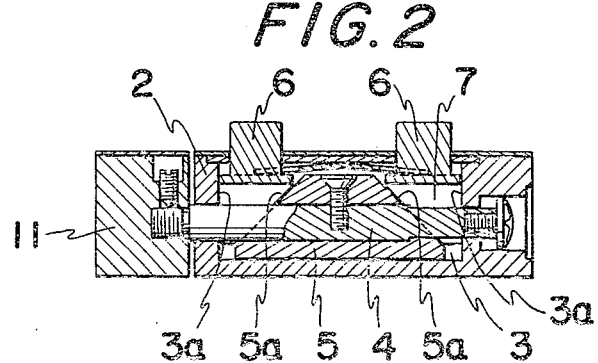
FIG. 2 is an enlarged cross section taken along a line II—II of FIG. 1.

The present invention is to provide for binoculars a push button-type focusing mechanism entirely different from conventional means.

The present invention will be described in detail by referring to the accompanying drawings, wherein a connecting plate 2 having a recessed portion 3 formed in the center thereof is pivotally attached to bodytubes 1 toward the end portions thereof, and a slide frame 5 having inclined surfaces attached to a lead shaft 4 is mounted in recessed portion 3. One end of lead shaft 4 slidably extends through one wall of recessed portion 3 and is attached to arm 11. The inclined legs 7 of push buttons 6, which legs are slidable in a direction orthogonal to the lead shaft, are positioned on the inclined surfaces 5a of inclined slide frame 5 and between the inclined surfaces and perpendicular walls 3a of recessed portion 3. A balance spring 8 contacts shoulder portions 6a of both push buttons 6 and a cover plate 9 holds down the balance spring 8 and also covers the opening of the depressed portion in the connecting plate. An arm 11 connected to shifting pins 10 which are attached to lens frames 13 is mounted on the extended portion of lead shaft 4.

Reference numerals 12 in the drawings denote stopper guide pins for arm 11 and to prevent unintentional turning of arm 11 around lead shaft 4.

The operation of the present invention will now be described. The binoculars are held with both hands and while looking into the binoculars, the index fingers are placed on the two push buttons 6 and by pressing either push button downward, focusing of a short distance or a long distance can be effected.

When push button 6 of one side is pressed, the inclined leg 7 is slidably moved downward between the inclined surface 5a of slide frame 5 and perpendicular wall 3a of depressed portion 3, and the slide frame is caused to move slidably in the direction of the other push button. Lead shaft 4, integrally attached to slide frame 5 and arm 11, provides a means for shifting lens frame 13 in the direction of an optical axis by means of pins 10.

Accordingly, when one push button is pressed, the other push button is caused to move slidably and automatically upward, and the focusing manipulation can always be carried out by only pushing the push buttons.

Both push buttons are prevented from being unintentionally moved upward by the balance spring 8 contacting the shoulder portions 6a and the cover plate 9 for holding the balance spring down.

Consequently, the present invention allows rapid and accurate focusing by merely pushing the push buttons with the fingertips. Unintentional movement can be avoided even if the focusing operation is performed while looking into the binoculars and the object being observed is moving. These are excellent effects of the present invention. Also, the manipulation of the present invention can be carried out by natural movement of the fingertips so that the user feels no fatigue, even if he uses the binoculars for long hours which is another feature of the present invention.

What is claimed is:

1. A push button-type mechanism for binoculars comprising, a connecting plate having a recessed portion, the plate at each end thereof being attached to body tubes having lens frames, the recessed portion having a bottom and side walls, a slide frame having inclined surfaces positioned in the recessed portion, a set of push buttons having shoulder portions and inclined legs slidably positioned on the inclined surfaces of the slide frame and between the inclined surfaces and the walls of the recessed portion, wherein depression of the buttons moves the slide frame in a forward or reverse direction, and coupling means coupling the slide frame to the lens frames, wherein movement of the slide frame causes movement of the lens frames to focus on an object being observed.

2. The mechanism of claim 1 wherein the side walls of the recessed portion are perpendicular to the bottom.

3. The mechanism of claim 1 wherein the connecting plate is pivotally attached to the body tubes.

4. The mechanism of claim 1 wherein the slide frame is attached to a lead shaft, one end of the lead shaft extending slidably through one side wall of the recessed portion.

5. The mechanism of claim 1 wherein a balance spring contacts the shoulder portions of the push buttons.

6. The mechanism of claim 5 wherein a cover plate holds down the balance spring.

7. The mechanism of claim 1 wherein the coupling means includes the slide frame attached to one end of a lead shaft, an arm attached to the other end of the lead shaft and the arm attached to the lens frames.

8. A push button-type mechanism for binoculars comprising, a connecting plate having a recessed portion with a bottom and side walls formed in the center portion thereof, the plate at each end thereof being pivotally attached to body tubes having lens frames, the side walls being perpendicular to the bottom, a slide frame having inclined surfaces attached to a lead shaft and positioned in the recessed portion such that one end of the shaft extends slidably through one side wall of the recessed portion, a set of push buttons having shoulder portions and inclined legs slidably positioned on the inclined surfaces of the slide frame and between the inclined surfaces and perpendicular walls of the recessed portion, a balance spring contacting the shoulder portions of the push buttons, a cover plate to hold down the balance spring, and an arm attached to the extended portion of the lead shaft, the arm being attached to the lens frames, wherein depression of the buttons causes the lens frames to move to a position of focus on an object being observed.

* * * * *